April 11, 1961 C. E. ANGLIM ET AL 2,979,179
TAPE EMBOSSING AND LABEL MAKING MACHINE
Filed Nov. 30, 1959 5 Sheets-Sheet 1

INVENTORS
Charles E. Anglim
William M. Bell
BY
Gardner & Zimmerman
Attorneys

April 11, 1961 C. E. ANGLIM ET AL 2,979,179
TAPE EMBOSSING AND LABEL MAKING MACHINE
Filed Nov. 30, 1959 5 Sheets-Sheet 2
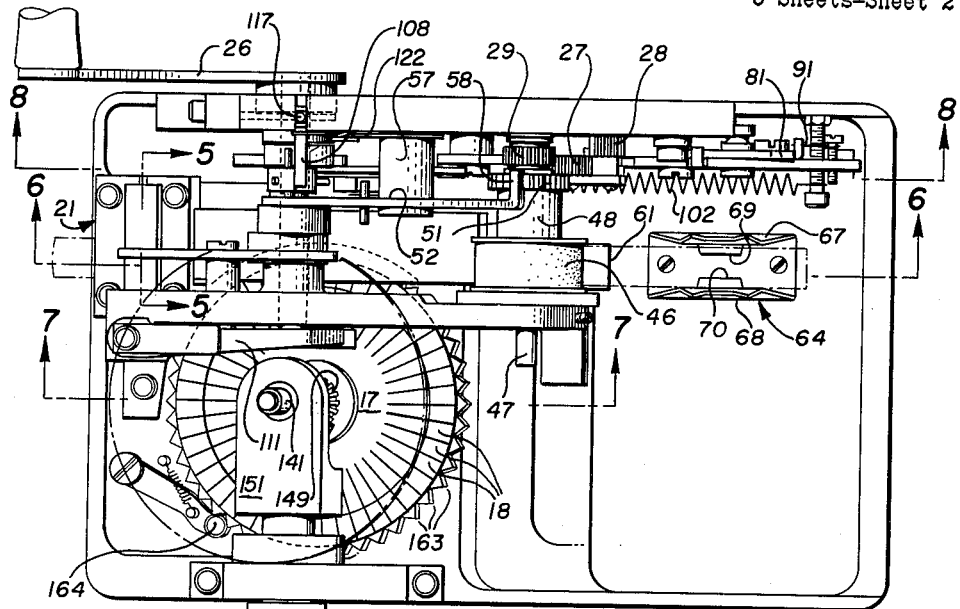
Fig. 4
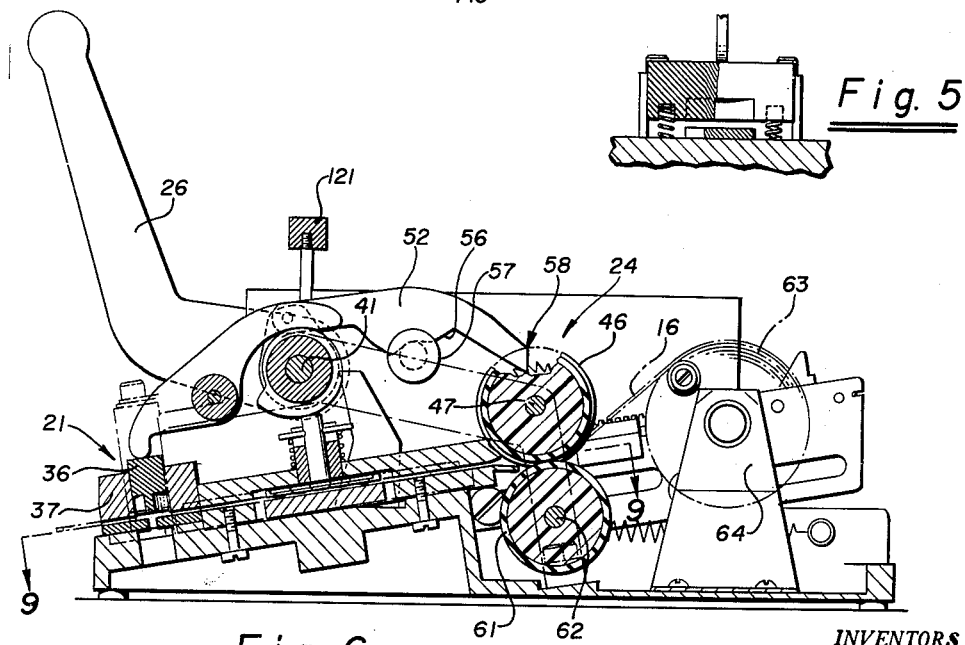
Fig. 5
Fig. 6
INVENTORS
Charles E. Anglim
BY William M. Bell
Gardner & Zimmerman
Attorneys INVENTORS
Charles E. Anglim
William M. Bell
BY
Gardner & Zimmerman
Attorneys April 11, 1961   C. E. ANGLIM ET AL   2,979,179
TAPE EMBOSSING AND LABEL MAKING MACHINE
Filed Nov. 30, 1959   5 Sheets-Sheet 4
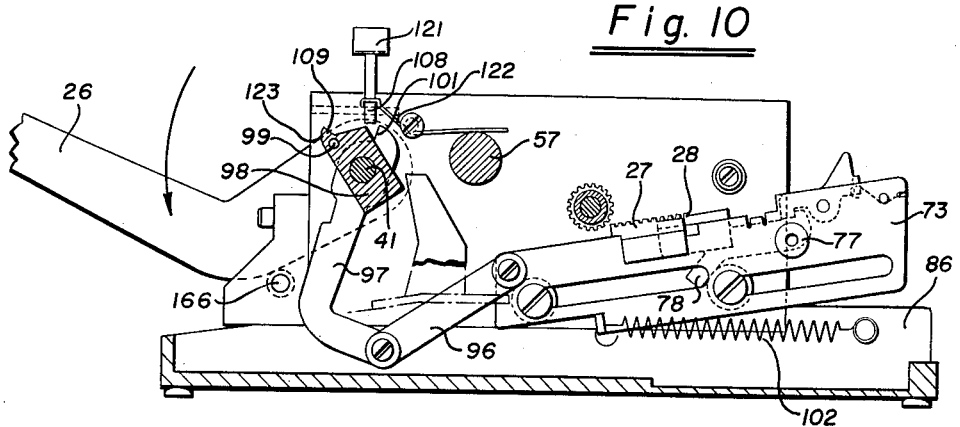
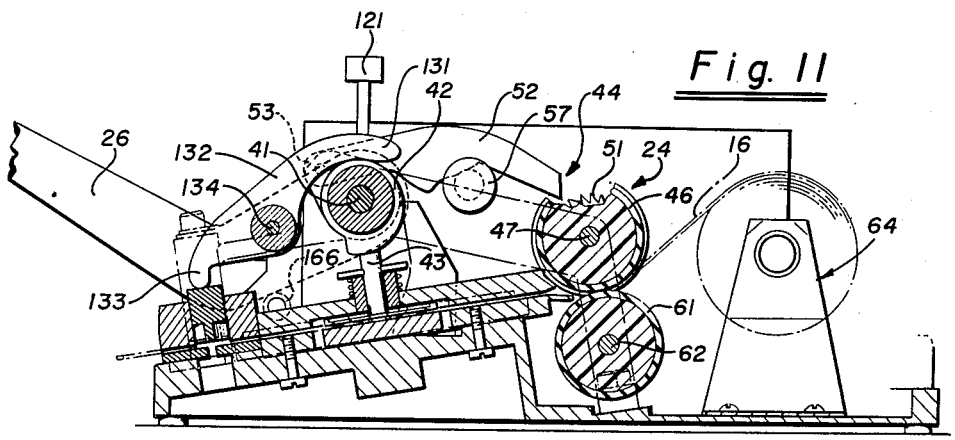
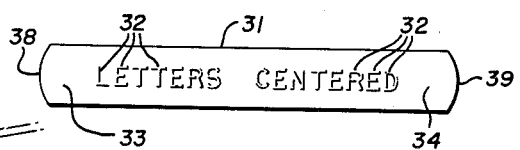
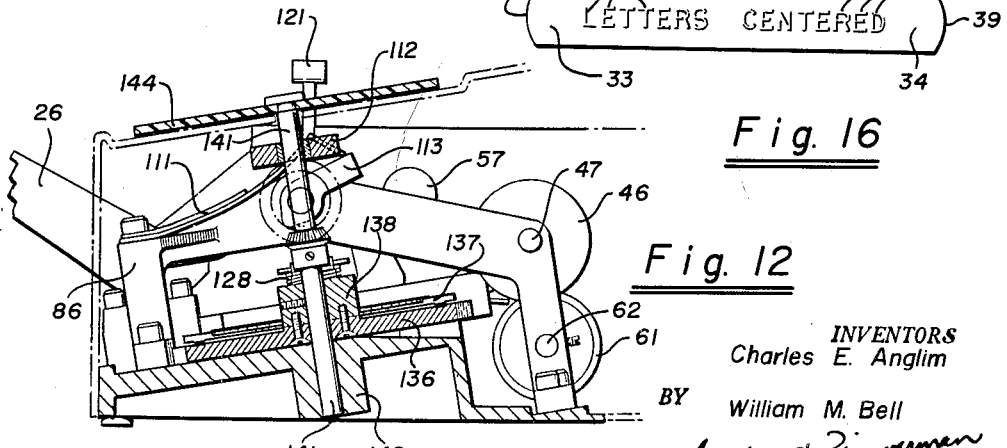
INVENTORS
Charles E. Anglim
William M. Bell
BY
Gardner & Zimmerman
Attorneys April 11, 1961  C. E. ANGLIM ET AL  2,979,179
TAPE EMBOSSING AND LABEL MAKING MACHINE
Filed Nov. 30, 1959  5 Sheets-Sheet 5

INVENTORS
Charles E. Anglim
William M. Bell
BY
Gardner & Zimmerman
Attorneys

United States Patent Office 2,979,179
Patented Apr. 11, 1961

2,979,179
TAPE EMBOSSING AND LABEL MAKING MACHINE

Charles E. Anglim, Berkeley, and William M. Bell, San Pablo, Calif., assignors to Dymo Industries, Inc., a corporation of California Filed Nov. 30, 1959, Ser. No. 856,186

8 Claims. (Cl. 197—6.7)

The invention relates to label making machines which function by embossing letters, numbers or other characters in a length of relatively soft, malleable metal or plastic tape.

An object of the present invention is to provide a machine of the character above which will produce labels of improved appearance; which is specially designed for producing custom labels in which the individual characters may be easily and quickly selected and rapidly embossed on a tape in successive order and the tape cut off to make up a desired label; and in which the words or other embossed information will be automatically centered between two equal end margins on the tape label.

Another object of the present invention is to provide a tape embossing and label making machine of the character described in which all of the necessary parts are associated and housed in an attractive, compact and portable unit suitable for desk top operation.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings (five sheets):

Figure 4 is a plan view of the interior mechanism with the housing removed.

Figure 5 is a fragmentary cross-sectional view taken substantially on the plane of line 5—5 of Figure 4.

Figure 6 is a cross-sectional view of the machine taken substantially on the plane of line 6—6 of Figure 4.

Figure 10 is a cross-sectional view similar to Figure 8 but showing the re-positioning of certain parts in the embossing stroke.

Figure 11 is a cross-sectional view similar to Figure 6 but showing the re-positioning of certain of the parts during the embossing stroke.

Figure 12 is a cross-sectional view similar to Figure 7 and showing the re-positioning of certain of the parts during the embossing stroke.

Figure 16 is a plan view of a label as produced by the present machine.

Figure 3:
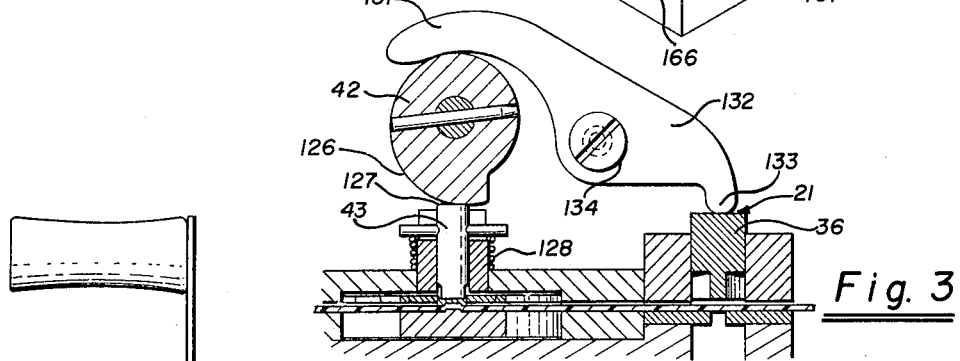
Figure 3 is a fragmentary cross-sectional view taken substantially on the plane of line 3—3 of Figure 2.
Figure 9:
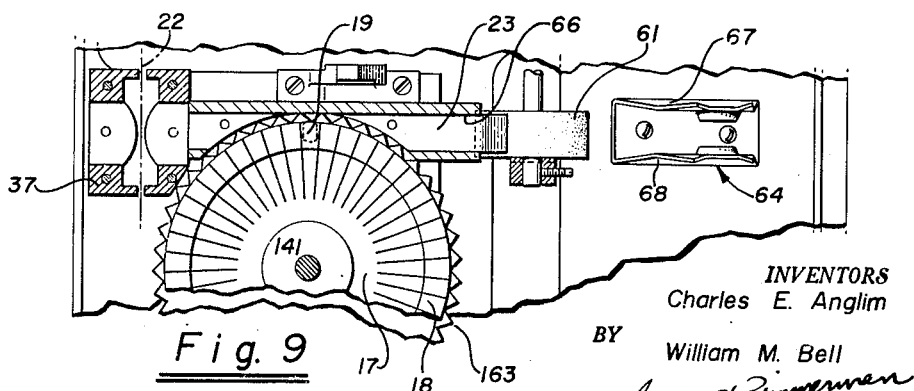
Figure 9 is a fragmentary plan sectional view taken substantially on the plane of line 9—9 of Figure 6.
Figure 13:
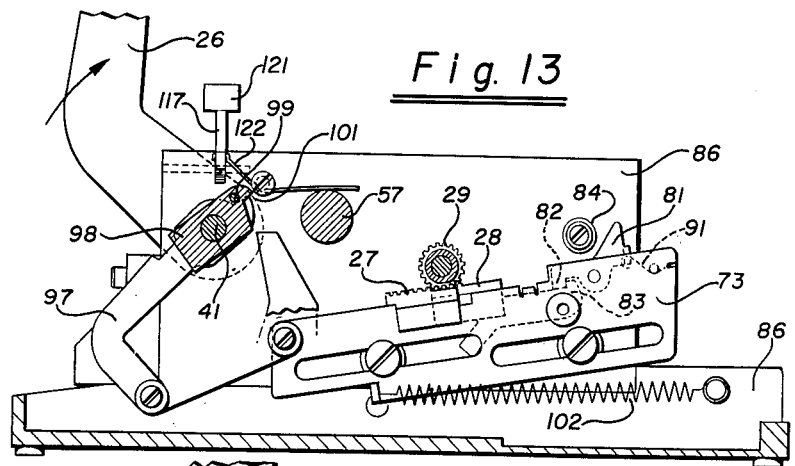
Figure 13 is a cross-sectional view similar to Figures 8 and 10 but showing a rearrangement of certain parts during the tape cutoff stroke.
Figure 14:
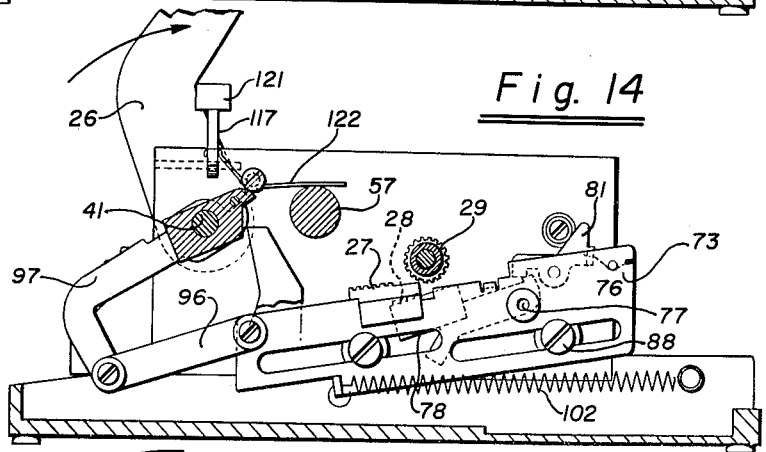
Figure 14 is a cross-sectional view of the machine similar to Figure 13 but showing a further advance of the parts during the cutoff stroke.
Figure 15:
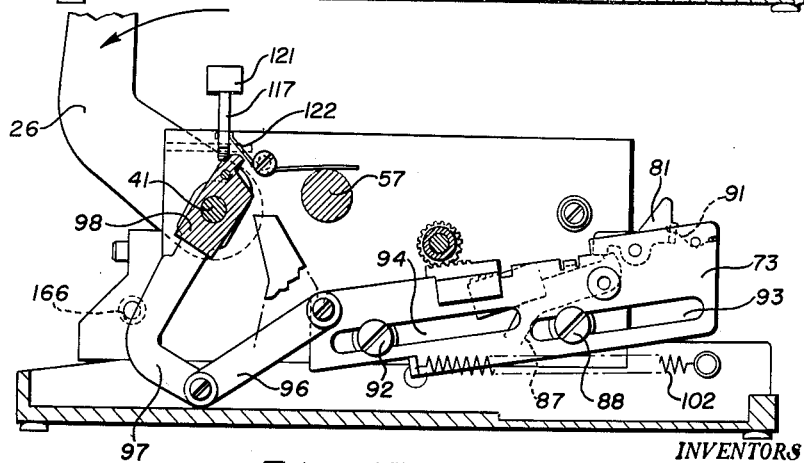
Figure 15 is a cross-sectional view similar to Figure 14 but showing a rearrangement of the position of the parts adjacent to the end of the cutoff stroke.

The tape embossing and label making machine of the present invention is designed as above noted for embossing a series of characters on an elongated tape 16 of relatively soft, malleable metal or plastic material and consists briefly of a die 17 having a plurality of sets 18, see Figures 4 and 9, of opposed sections manually positionable to receive tape 16 therebetween at an embossing position 19, see Figure 9, and functioning on closing to emboss a character in the tape; tape cutoff means 21, see Figures 3 and 6, providing a tape cutoff position as suggested by dashed line 22 in Figure 9, at a predetermined spacing from the embossing position 19 and in alignment therewith; tape supporting means 23 including a drive 24, see Figures 6 and 9, for advancing tape to the embossing and cutoff positions; a manually displaceable operating member 26 connected for closing the die set positioned at embossing position 19 and effecting a step-by-step advancement of the tape toward embossing and cutoff positions; and means generally illustrated in the series of views constituting Figures 13–15 and in Figure 3 for operating the tape cutoff means 21 and including a tape drive, see racks 27 and 28 and pinion 29 in Figures 13–15, for advancing and retracting the tape and functioning on a forward stroke as illustrated in Figure 13, to advance the tape by a distance equal to the aforementioned spacing between positions 19 and 22, plus a desired margin and then to cut off the tape, and on a reverse stroke, see Figure 15, to retract tape remaining in the machine from the cutoff position 22 by a distance equal to the aforementioned spacing minus the margin, whereby delivered tape length labels 31, see Figure 16, will have embossed characters 32 substantially centered thereon between margins 33 and 34 at each end. As a further feature of the present invention the tape cutoff means 21 includes a double-sided concavo-concave shearing blade 36 mounted for vertical reciprocation in a similarly formed female die 37, see Figures 3 and 9, which co-function to form the leading and trailing ends 38 and 39 of the label 31 with a convexly rounded form as illustrated in Figure 16.

As another feature of the present invention the manually displaceable operating member 26 is provided with two distinct paths of movement, one forwardly as illustrated generally in Figures 10–12 to effect an embossing of the tape and a step advancement thereof; and a second path rearwardly of a common central position of rest, and as generally illustrated in Figures 13–15, so as to effect the cut-off of the tape and the centralizing of the label message as above discussed.

Each of these two paths of motion include a forward and return stroke as referenced from a common position of rest. During the forward stroke in the first embossing path of movement, the operating member 26 connected through shaft 41, cam 42, and reciprocating pin 43, see Figure 11, causes a closing of the die set located at embossing position 19. On the return stroke of member 26 in its first path of movement, a pawl and ratchet means 44 forms the operating link between member 26 and drive 24 to effect a step advancement of tape 16 toward embossing and cut-off positions. Drive 24 here includes a compressible rubber roller 46 which is journalled on shaft 47 generally parallel to shaft 41 and is formed with a hub 48, see Figure 4, which carries a concentric ratchet wheel 51. A pawl 52 is pivoted at one end 53, see Figures 2, 6, and 12, to a crank member 54 on shaft 41 so as to cause a relative horizontal retraction and advance of pawl 52 upon movement of member 26 through its forward and return strokes in the embossing cycle. The underside 56 of pawl 52 is specially contoured to ride upon a horizontal pin support 57 so as to permit the opposite end 58 of the pawl to slide over the ratchet teeth during the forward movement of the pawl as generally illustrated in Figure 12, and to engage the ratchet teeth and cause a clockwise rotation of roller 46 upon return movement of member 26, as illustrated in Figure 6. A second relatively lower positioned roller 61 here co-functions with roller 46 to grip tape 16 therebetween and provide the drive therefor. Roller 61 is here carried on a shaft 62 set parallel to roller shaft 47.

Tape suitable for labelling purposes is conventionally supplied in roll form such as depicted by roll 63 in Figure 6, and a mounting 64 is here provided for the roll in general alignment with rollers 46 and 61 and a guide channel 66 leading the tape to embossing position 19 and cut-off position 22, see Figure 9. Mounting 64 may simply be composed of a pair of opposed resilient sides 67 and 68 having aligned hubs 69 and 70 for concentrically mounting the conventional hollow center of tape roll 63.

The tape transport arrangement for advancing and retracting the tape during the forward and return strokes of the second path of movement of member 26 (the cut-off cycle) to effect a centralizing of the tape message and a cut-off of the tape, is generally depicted in Figures 13 to 15. This section of the mechanism includes a carriage 73 mounted for fore and aft reciprocation past pinion 29 and which is connected to shaft 41 for movement through forward and reverse strokes upon movement of shaft 41 and member 26 through its forward and return strokes in the cut-off cycle of operation. Racks 27 and 28 are mounted on carriage 73 so as to mesh with pinion 29 to effect rotation thereof through the forward and reverse strokes of the carriage to advance and retract the tape. Rack 28 is mounted on the carriage for movement to and from a position meshing with pinion 29 and is caused to drive the pinion during the forward stroke of the carriage and to disengage the pinion on the reverse stroke, racks 27 and 28 being designed of a length to provide the differentiation in tape movement to center the characters as above discussed. As here shown, rack 28 is fashioned as a lever arm having one end 76 pivoted to carriage 73 by pin 77 so that the opposite end portion 78 carrying the rack teeth may be swung into and out of alignment with rack 27 so as to engage and disengage pinion 29. As will be observed from Figure 4, rack 28 is set directly behind rack 27 and the teeth on rack 28 form a continuation of the teeth on rack 27 when rack 28 is in alignment so that continuity of rotation of pinion 29, whose teeth are wide enough to engage both racks, is effected. Rack 28 is normally held in an elevated aligned position as illustrated in Figure 13 by means of a pivoted detent 81 having a hooked end 82 arranged to engage and hold a hook 83 fashioned on end 76 of the rack arm 28. During the forward movement of the carriage, detent 81 is brought into engagement with a pin 84 on the frame 86 of the mechanism so as to rotate the detent to drop out the engaged hook 83 at the forward portion of the stroke thus permitting rack 28 to drop away from pinion 29 after the rack has performed its function in rotating pinion 29. On the return stroke, a depending lug 87 on the rack arm 28 engages frame mounted pin 88, see Figure 15, and causes the elevation of the rack 28 to its upward aligned position and reengagement of the detent hook 82 with the rack hook 83, detent 81 being constantly biased by a spring 91 to cause re-engagement of hooks 82 and 83. Pin 88 here also functions with another frame mounted pin 92 to support carriage 73, pins 88 and 92 being mounted through elongated slots 93 and 94 to guide and support carriage 73 in its fore and aft reciprocation.

The operating connection between carriage 73 and shaft 41 is here effected by a link 96 pivoted between the forward end of carriage 73 and the lower end of lever arm 97 freely journalled on shaft 41. A crank arm 98 fixed to shaft 41 is provided with a transversely extending pin 99 which engages a shoulder 101, best seen in Figure 10, on the upper end of lever arm 97 so as to pick up and swing lever arm 97 upon rearward rotation only of shaft 41, that is during the second or cut-off cycle of operation above described. During the first or embossing cycle of operation, as depicted in Figure 10, pin 99 moves away from shoulder 101 so that during this cycle of operation the tape transport means generally depicted in Figures 13–15 remains inactive and is activated only upon a reverse rotation of the shaft from its position of rest as illustrated in Figures 13–15. In this second cycle of operation, the advance stroke of the parts is resisted by a spring 102 connected between frame 86 and carriage 73 and which serves to displace the parts on the return stroke.

Preferably all of the tape embossing, transporting and cut-off functions are controlled from shaft 41 which is in turn controlled by the manually engageable operating member 26 here in the form of a crank arm fastened to one end 103 of shaft 41 projecting through a side 104 of a housing 106 for the machine. An off-set laterally projecting roller 107 is here secured to the opposite end of lever arm for convenient manual engagement and displacement. A stop 108 carried by frame 86 and engageable with a shoulder 109 on a crank arm 98 defines a neutral or rest position of the member 26 which is common to the two cycles of operation above described. Flat spring 111, see Figures 4 and 12, having one end anchored to the frame 86 and its opposite end 112 bearing against a crank arm 113 supplies a constant bias urging shaft 41 and operating member 26 to its position of rest with shoulder 109 engaged with stop 108. During the forward stroke of the tape embossing cycle as illustrated in Figures 10 and 12, spring 111 is placed under resilient flexure as seen in Figure 12, and the spring thus functions to return the parts to rest position following the embossing stroke. Stop 108 is here fashioned as one end of a bell crank, see Figure 2, which is pivoted at a mid point by pin 116 and has an upstanding arm 117 which extends up through a slot 118 in the top wall 119 of the housing 106, and is fitted at its upper end with a knob 121 for convenient manual engagement and lateral displacement so as to lift the opposite arm end 108 out of engagement with shoulder 109 when the operator wishes to put the parts through the cut-off stroke. The bell crank stop 108 is here biased to a return position engageable with shoulder 109 by means of spring 122. Preferably the crank arm 98 is fashioned with a rounded cam surface 123 at the back side of shoulder 109 so as to automatically engage and elevate stop 108 upon return of the parts to rest position at the end of the second or cut-off cycle of operation.

The closing of the die sections at the end of the forward stroke of the embossing cycle, and the operation of the cut-off die at the end of the forward stroke of the cut-off cycle of operation are both preferably accomplished by cam operation from shaft 41. In the present structure the same cam member 42 is conveniently used for both purposes. As may be best seen from Figures 3, 6, and 11, this cam is mounted directly over the vertically reciprocating pin 43 which is used to compress the die sections at the embossing position, and is fashioned with a lobe 126 which bears directly upon the upper end 127 of pin 43 to depress the pin against the action of a surrounding spring 128 when the operating arm 26 is drawn forwardly in a counter clockwise direction, as viewed in Figures 6 and 11 (clockwise in Figure 3). In the opposite direction of rotation of the operating arm 26 and shaft 41, lobe 26 rides upwardly against the underside of one end 131 of a frame supported lever 132 thus causing the opposite end 133 to bear downwardly upon and actuate the cut-off die 36. Lever 132 is here pivoted intermediate its length on pin 134.

Figure 1:
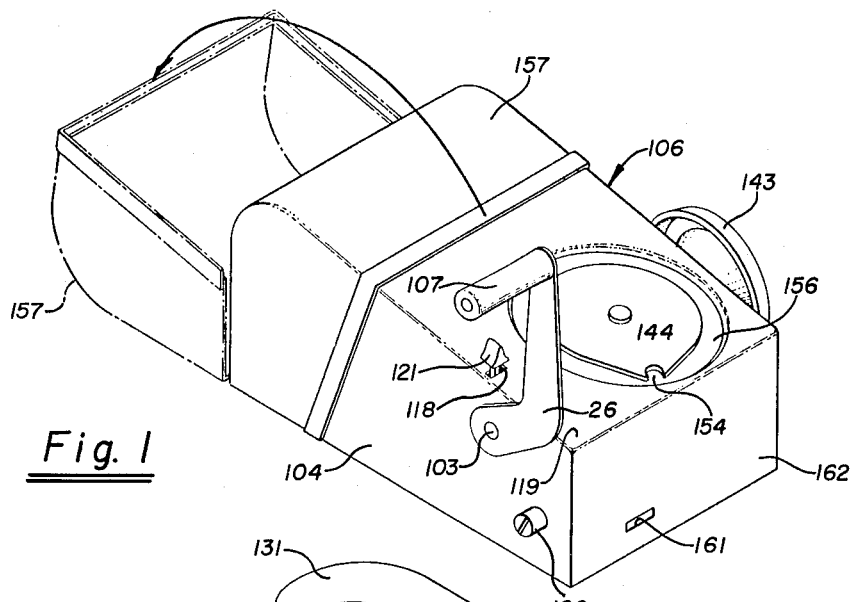
Figure 1 is a perspective view of a tape embossing and label making machine constructed in accordance with the present invention.
Figure 2:
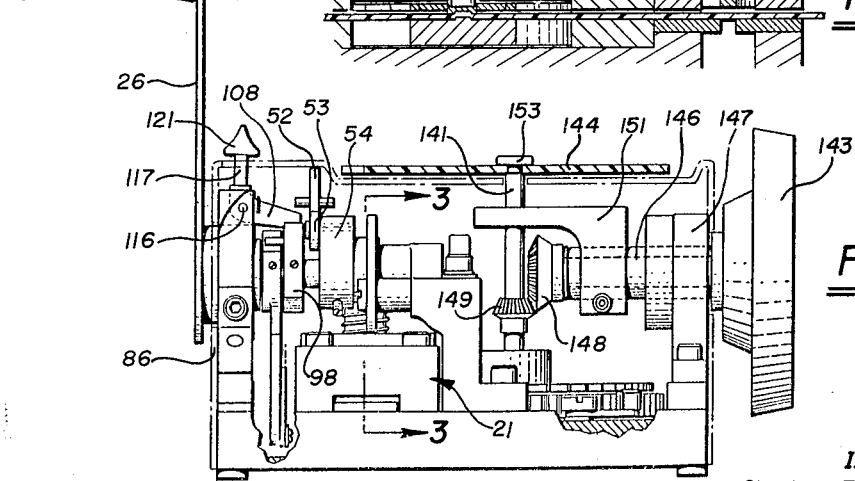
Figure 2 is a transverse cross-sectional view taken inside the front wall of the housing and showing the interior mechanism generally in end elevation.
Figure 7:
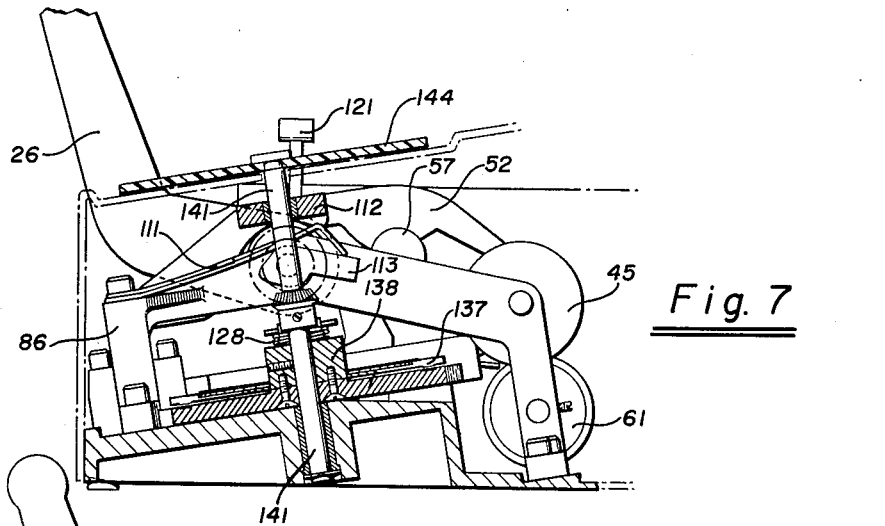
Figure 7 is a cross-sectional view of the machine taken substantially on the plane of line 7—7 of Figure 4.
Figure 8:
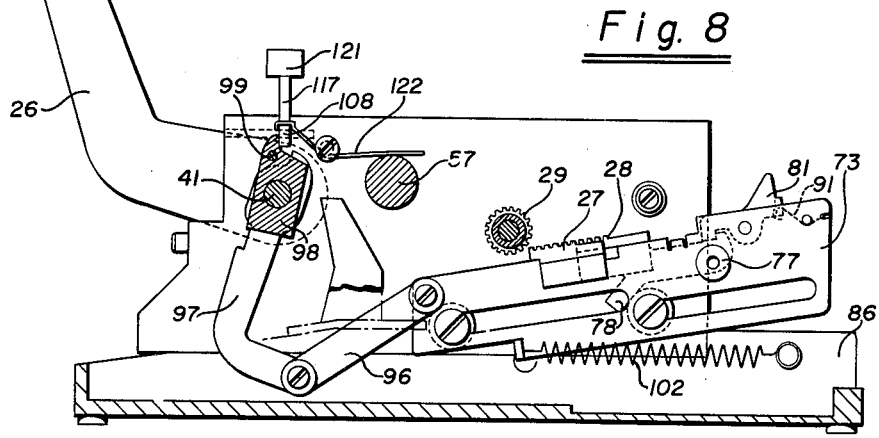
Figure 8 is a cross-sectional view of the machine taken substantially on the plane of line 8—8 of Figure 4.

The die wheel 17 is here composed of a solid base disc 136, see Figures 7 and 12, and a superimposed slitted resilient disc 137, the latter being formed with radial slots as seen in Figure 9 to provide the plurality of leaves or sections 18. The two discs are locked for common rotation on a hub 138 so that the leaves 18 and the underlying area of the bottom disc 136 always remain in registration. The characters to be embossed are formed by interfitting male and female die portions formed on the confronting facts of the leaves 18 and disc 136. The hub 138 of the wheel thus formed is mounted on a generally vertically extending shaft 141 journalled for free rotation at its lower end in a bearing boss 142 formed in the bottom of the frame. Thus the die wheel may be rotated to place any of the sections or leaves 18 at embossing position 19, and the two discs are supported in spaced relation so as to receive tape 16 therebetween for embossing. The upper disc 137 may be formed of any hard resilient material such as spring bronze, etc. A hand knob or wheel 143, see Figures 1 and 2, is journalled for rotation externally of housing 106 and is provided with a geared connection to the die wheel 17 for effecting rapid selective rotation of the die wheel to place one of the selected leaves 18 at embossing position, and an external revolving indicator 144 is provided for indicating to the user the particular character selected for embossing. As here shown hand wheel 143 is secured to the outer end of a generally horizontally disposed shaft 146 which is journalled in frame bearing 147 for free rotation and is operatively connected at its inner end to shaft 141 by bevelled gears 148 and 149 mounted on shafts 146 and 141 respectively. Preferably the gearing is such as to speed up the rotation of shaft 141 to thereby permit the operator to effect a very rapid selection of each character with a relatively small rotative effort applied to hand wheel 143. Shaft 141 is here carried upwardly through bearing bracket 151 and to above the top wall 119 of the housing. Indicator 144 is here composed of a flat disc fixed to the upper end 153 of shaft 141 for rotation therewith and is formed with a peripheral notch 154 which sweeps over an underlying circular area 156 upon which may be imprinted the various characters provided on the die sections 18 so that notch 154 will indicate the particular character which is at the embossing position.

In order to facilitate the loading of the machine with tape, a rear section 157 of the housing 106 is hinged to swing back and open as suggested in phantom lines in Figure 1 thus exposing for easy access the tape roll mounting 64 and the feed rollers 46 and 61. A roll of tape is mounted on the mounting bosses 69 and 70 and the free tape end is then fed through the feed rollers 46 and 61, preferably by manual turning of the upper roller 46, and the operator continues to feed the tape on through guide 23 and between the sections of the die wheel and on through the cut-off die 37 and out of an opening 161 in the front wall 162 of the housing. The operator then laterally displaces the stop knob 121 and swings handle 26 rearwardly to initiate operation by first going through the cut-off cycle. In this cycle, the tape is first advanced forwardly, cut off, and then retracted rearwardly so as to leave a margin spacing 33 between the leading end 38 of the tape in the machine and the embossing position 19. The operator may then engage selector wheel 143 with his right hand and effect a rapid spinning of the indicator 144 to the character to be embossed. In this spinning operation a plurality of circumferentially spaced notches 163 on the die wheel, equal in number to the number of characters on the wheel, are caused to traverse a spring mounted roller 164 to thus provide an audible snap-acting detenting and positive indexing of the wheel at each of its embossing positions. As soon as the character has thus been selected the operator may pull forwardly and downwardly on handle 107 held in his left hand to effect embossing of the tape. Due to the leverage afforded, only a light uniform pressure is required. On the return upward stroke of the handle the tape steps forwardly for embossing of the next character. The two-handed selection and embossing operation may thus proceed very rapidly until all of the characters have been embossed. Spacing between characters may be effected by a short downward stroke which is insufficient to operate the embossing cam 42 but is sufficient to operate the pawl and ratchet 44. When the last character of the label has been embossed the operator again displaces stop 121 and swings the handle up and rearwardly through the forward and reverse strokes of the cut-off cycle. During the forward stroke of such cycle, the two racks 27 and 28 engage pinion 29 to advance the tape by a distance equal to the spacing between embossing and cut-off positions plus the desired margin space 33 and 34. The tape is then cut off in dies 36 and 37 to give the trailing end 39 of the label and the leading end of the tape remaining in the machine, a rounded shape as illustrated in Figure 16. Thus positive embossing with uniformity is provided free from the need of operator judgment. To insure uniform embossing of each of the characters in the label, a stop 166 may be provided on the side of the housing in position to engage lever arm 26 at the end of the embossing stroke so that precise uniformity in depth embossment may be insured by advancing the lever arm 26 to the stop 166 on each embossing stroke.

We claim:

1. A machine for embossing a series of characters on an elongated tape comprising die means positionable to receive tape at an embossing position and actuatable to emboss characters in said tape, tape cut-off means providing a tape cut-off position at a pre-determined spacing from said embossing position and in alignment therewith, tape supporting means including a drive for advancing tape to said embossing and cut-off positions, a manually displaceable operating member engageable with and for actuating said die means and effecting a step by step advancement of said tape toward embossing and cut-off positions, and means operating said tape cut-off means and including a tape drive for advancing and retracting said tape and functioning on a forward stroke to advance said tape by a distance equal to said spacing plus a desired margin and then to actuate said tape cut-off means to cut off said tape and on a reverse stroke to retract tape in the machine from said cut-off position by a distance equal to said spacing minus said margin whereby delivered tape-length labels will have embossed characters substantially centered thereon between margins at each end.

2. A tape embossing machine as characterized in claim 1 wherein said tape cut-off means includes a double-sided concavo-concave shearing blade functioning to form the leading and trailing ends of said labels with a convexly rounded form.

3. A tape embossing machine as characterized in claim 1 wherein said last-named tape drive includes a drive roller for engaging and advancing and retracting said tape, a pinion connected to said roller for rotation therewith, and racks connected to said cut-off operating means and displaceable thereby into and out of engagement with said pinion on said forward and reverse strokes for providing the tape advancing and retracting distance differentials aforesaid.

4. A machine for embossing a series of characters on an elongated tape comprising die means positionable to receive tape at an embossing position and actuatable to emboss characters in said tape, tape cut-off means providing a tape cut-off position at a pre-determined spacing from said embossing position and in alignment therewith, tape supporting means including a drive roller for advancing and retracting tape to and from said embossing and cut-off positions, a manually displaceable operating member engageable with and for actuating said die means and said roller and having a path of movement for closing said die sets and effecting a step by step advancement of said tape toward embossing and cut-off positions, said member having other operating connections to said tape cut-off means and said roller functioning upon displacement of said member through another path of movement to successively advance said tape by a distance equal to said spacing plus a desired margin and cut off tape and retract tape in the machine from said cut-off position by a distance equal to said spacing minus said margin whereby delivered tape-length labels will have embossed characters substantially centered thereon between margins at each end.

5. A machine for embossing a series of characters on an elongated tape comprising a die wheel having a plurality of sets of opposed sections spaced to receive tape therebetween and manually rotatable to an embossing position, a reciprocating pin mounted to engage and close said sections at said embossing position to emboss a character in said tape, tape cut-off means providing a tape cut-off position at a pre-determined spacing from said embossing position and in alignment therewith, tape supporting means including a drive roller for advancing and retracting tape to and from said embossing and cut-off positions, a manually engageable and displaceable operating member having a position of rest and being mounted for movement through first and second paths of motion therefrom with each path having a forward and return stroke referenced from said position of rest, means connecting said member to said pin for closing said die sections upon movement of said member in its forward stroke in said first path, pawl and ratchet means connecting said member to said drive roller on the return stroke of said member in said first path to effect a step advancement of said tape toward embossing and cut-off positions, a pinion connected to said drive roller for rotation therewith, racks mounted for movement into and out of engagement with said pinion and being connected to said operating member to effect upon movement of the latter through its forward stroke in said second path an advancing of said tape by a distance equal to said spacing plus a desired margin and on the return stroke of said member in said second path a retraction of tape in the machine from said cut-off position by a distance equal to said spacing minus said margin, and means connecting said operating member to actuate said tape cut-off means at the end of said forward stroke of said second path whereby delivered tape length labels will have embossed characters substantially centered thereon between margins at each end.

6. A machine for embossing a series of characters on an elongated tape comprising a die wheel having a plurality of sets of opposed sections spaced to receive tape therebetween and manually rotatable to an embossing position, a reciprocating pin mounted to engage and close said sections at said embossing position to emboss a character in said tape, tape cut-off means providing a tape cut-off position at a pre-determined spacing from said embossing position and in alignment therewith, tape supporting means including a drive roller for advancing and retracting tape to and from said embossing and cut-off positions, a shaft and a manually engageable and displaceable crank arm connected thereto, a stop and a spring connected to said shaft and arm for biasing the latter to a position of rest against said stop, a cam on said shaft engageable with and displacing said pin to close said sections upon rotation of said arm in a forward stroke from said stop, pawl and ratchet means connecting said shaft and drive roller on the return stroke of said arm to effect a step advancement of said tape toward embossing and cut-off positions, a pinion connected to said drive roller for rotation therewith, said stop being manually displaceable out of engagement with said shaft and arm to permit rotation of said arm in a rearward stroke from said position of rest and in a second return stroke, racks mounted for movement into and out of engagement with said pinion and being connected to said shaft to effect on movement of the latter through said rearward stroke an advancing of said tape by a distance equal to said spacing plus a desired margin and on said return stroke of said shaft a retraction of tape in the machine from said cut-off position by a distance equal to said spacing minus said margin, and means connected to said shaft to actuate said tape cut-off means at the end of said rearward stroke whereby delivered tape-length labels will have embossed characters substantially centered thereon between margins at each end.

7. A machine for embossing a series of characters on an elongated tape comprising a die having a plurality of sets of opposed sections manually positionable to receive tape therebetween at an embossing position and functioning on closing to emboss a character in said tape, tape cut-off means providing a tape cut-off position at a pre-determined spacing from said embossing position and in alignment therewith, tape supporting means including a drive roller for advancing and retracting tape to and from said embossing and cut-off positions, a shaft and a manually engageable and displaceable crank arm connected thereto having a position of rest and being mounted for movement through first and second paths of motion therefrom with each path having a forward and return stroke, means connecting said shaft for closing said die sections upon movement of said arm in its forward stroke in said first path, pawl and ratchet means connecting said shaft and said drive roller on the return stroke in said first path to effect a step advancement of tape toward embossing and cut-off positions, a pinion connected to said drive roller for rotation therewith, a carriage mounted for reciprocation past said pinion and being connected to said shaft for movement through forward and reverse strokes upon movement of said shaft through its forward and return strokes in said second path respectively, a rack mounted on said carriage in position to mesh with said pinion to effect rotation thereof through said forward and reverse strokes of said carriage to advance and retract tape, a second rack mounted on said carriage for movement to and from a position meshing with said pinion, means positioning said second rack to mesh with said pinion on said forward stroke of said carriage and to disengage said pinion on said reverse stroke of said carriage, said racks being designed to co-function with the selective engagement of said second rack as aforesaid to effect during said forward stroke of said carriage an advancing of said tape by a distance equal to said spacing plus a desired margin and to effect upon the reverse stroke of said carriage a retraction of tape by a distance equal to said spacing minus said margin, and means connected to said shaft for actuation of said tape cut-off means at the end of said forward stroke of said arm in said second path.

8. A machine for embossing a series of characters on an elongated tape comprising a housing, a die wheel journalled for rotation in said housing and having a plurality of opposed sections spaced to receive tape therebetween and functioning on closing to emboss a character in said tape and presenting in the plurality of sections a plurality of dies for different characters, a hand engaging knob journalled for rotation externally of said housing and having a geared connection to said wheel for effecting rapid selective rotation thereof to advance desired sections to an embossing position, tape cut-off means having a pre-determined spacing from said embossing position and in alignment therewith, tape supporting means including a drive for advancing tape to said embossing and cut-off positions, a manually displaceable operating member connected for closing the die section at embossing position and effecting a step by step advancement of said tape toward embossing and cut-off positions, and means operating said tape cut-off means and including a tape drive for advancing and retracting said tape and functioning on a forward stroke to advance said tape by a distance equal to said spacing plus a desired margin and then to cut off said tape and on a reverse stroke to retract tape in the machine from said cut-off position by a distance equal to said spacing minus said margin whereby delivered tape-length labels will have embossed characters substantially centered thereon between margins at each end.

References Cited in the file of this patent

UNITED STATES PATENTS

| | | |
|---|---|---|
| 735,709 | Casler | Aug. 11, 1903 |
| 775,354 | Roovers | Nov. 22, 1904 |
| 2,275,670 | Zipf | Mar. 10, 1942 |